(12) United States Patent
Morihisa

(10) Patent No.: US 12,270,773 B2
(45) Date of Patent: Apr. 8, 2025

(54) X RAY FLUORESCENCE ANALYZER

(71) Applicant: Shimadzu Corporation, Kyoto (JP)

(72) Inventor: Yuji Morihisa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 168 days.

(21) Appl. No.: 18/015,655

(22) PCT Filed: Jul. 14, 2020

(86) PCT No.: PCT/JP2020/027312
§ 371 (c)(1),
(2) Date: Jan. 11, 2023

(87) PCT Pub. No.: WO2022/013934
PCT Pub. Date: Jan. 20, 2022

(65) Prior Publication Data
US 2023/0251214 A1    Aug. 10, 2023

(51) Int. Cl.
*G01N 23/223*    (2006.01)

(52) U.S. Cl.
CPC ....... *G01N 23/223* (2013.01); *G01N 2223/30* (2013.01)

(58) Field of Classification Search
CPC ............ G01N 23/223; G01N 2223/30; G01N 2223/076
See application file for complete search history.

(56) References Cited

U.S. PATENT DOCUMENTS

| | | | |
|---|---|---|---|
| 3,925,678 A | 12/1975 | Eberspaecher et al. | |
| 4,150,179 A | 4/1979 | Jones | |
| 5,832,054 A * | 11/1998 | Kuwabara | G01N 23/223 378/80 |
| 2001/0022830 A1 | 9/2001 | Sommer et al. | |
| 2004/0018316 A1 | 1/2004 | Choi et al. | |
| 2016/0161428 A1 | 6/2016 | Takahara et al. | |
| 2019/0064084 A1* | 2/2019 | Ullom | G01T 1/36 |
| 2019/0227007 A1 | 7/2019 | Troadec et al. | |

FOREIGN PATENT DOCUMENTS

| | | |
|---|---|---|
| CN | 101025401 A | 8/2007 |
| CN | 109964119 A | 7/2019 |
| JP | 6-330346 A | 11/1994 |

(Continued)

OTHER PUBLICATIONS

Notice of Reasons for Refusal for corresponding application No. JP 2022-536010 dated Aug. 16, 2023.

(Continued)

*Primary Examiner* — Kiho Kim
(74) *Attorney, Agent, or Firm* — Muir Patent Law, PLLC

(57) ABSTRACT

An X-ray fluorescence analyzer is provided with an X-ray source for irradiating a sample with X-rays, a detector for detecting fluorescence X-rays emitted from the sample due to X-ray irradiation, and a steel sample chamber for accommodating the sample. At least a part of an inner surface of the sample chamber is coated with a layer made of aluminum derived from molten aluminum, or substantially an entire surface of the inner surface of the sample chamber is coated with the layer made of aluminum derived from molten aluminum.

16 Claims, 3 Drawing Sheets

(56) References Cited

FOREIGN PATENT DOCUMENTS

| | | |
|---|---|---|
| JP | 2004-043882 A | 2/2004 |
| JP | 2004-197151 A | 7/2004 |
| JP | 2004245745 A | 9/2004 |
| JP | 2011-022163 A | 2/2011 |
| JP | 2013108726 A | 6/2013 |
| JP | 2016-109502 A | 6/2016 |

OTHER PUBLICATIONS

PCT Written Opinion of the International Searching Authority (Form PCT/ISA/237) for corresponding PCT application No. PCT/JP2020/027312 dated Oct. 13, 2020.
TW Office Action for corresponding Taiwanese application TW 110117616 dated Mar. 2, 2022.
Office Action for Taiwan patent Application No. 110117616 dated Jan. 9, 2023.
EESR dated Mar. 19, 2024 for corresponding EP Application No. 20945235.8.
Office Action for corresponding application No. CN 202080102888.3, dated Dec. 16, 2024.

\* cited by examiner

X RAY FLUORESCENCE ANALYZER

TECHNICAL FIELD

The present invention relates to an X-ray fluorescence analyzer.

BACKGROUND ART

An X-ray fluorescence analyzer is configured to irradiate a solid sample, a powder sample, or a liquid sample with primary X-rays and detect fluorescence X-rays excited and emitted by the primary X-rays to perform qualitative and/or quantitative analysis of elements contained in the sample. Currently, an X-ray fluorescence analyzer is widely used as a valuable analyzer, and its analysis target widely ranges from a metallic field to a food field.

FIG. 3 is a schematic diagram showing a configuration of a conventional X-ray fluorescence analyzer. The X-ray fluorescence analyzer 101 is provided with a sample chamber 20 for arranging a sample S threin, and a device housing 60 in which an X-ray source 10 and a detector 30 are arranged.

The sample chamber 20 has a rectangular plate-shaped sample base 21 and a rectangular cylindrical upper chamber 22 having a rectangular plate-shaped upper surface. A circular opening 21a is formed in the central portion of the sample base 21. The upper chamber 22 is mounted on the sample base 21 rotatably about an axis configured by a lower surface of one side wall of the upper chamber 22 and one side of the upper surface of the sample base 21. The inside of the upper chamber 22 is connected to a vacuum pump (not shown) and is evacuated by the vacuum pump. With this sample chamber 20, by opening the upper chamber 22, a sample S can be placed such that the analysis target surface of the sample S blocks the opening 21a, and after placing the sample S, the upper chamber 22 can be closed to evacuate the interior of the upper chamber 22.

The device housing 60 has a rectangular cylindrical shape having a rectangular plate-like lower surface, and the peripheral lower side edge portion of the sample base 21 is attached to the upper surface of the rectangular cylindrical shaped wall of the device housing. The X-ray source 10 and the detector 30 are provided in the device housing 60.

The X-ray source 10 is, for example, a point-focused X-ray tube and has a housing in which a target as an anode (not shown) and a filament as a cathode (not shown) are disposed. With this configuration, by applying a high voltage to the target and a low voltage to the filament, thermoelectrons radiated from the filament collide with the end face of the target, so that primary X-rays generated from the end face of the target are emitted.

The X-ray source 10 is fixedly attached to the lower left portion of the opening 21a of the sample base 21 and is configured such that the primary X-rays emitted from the X-ray source 10 enter the opening 21a at an incident angle θ. Therefore, the analysis surface of the sample S is arranged to close the opening 21a, so that the analysis surface of the sample S is irradiated with the primary X-rays at the incident angle θ.

The detector 30 has, for example, a housing in which an introduction window is formed, and a detection element (semi-conductor device) for detecting fluorescence X-rays is arranged in the housing. The detector 30 is fixedly attached to the lower right portion of the opening 21a of the sample base 21 such that fluorescence X-rays generated by the analysis surface of the sample S are incident on the introduction window. Therefore, when the analysis surface of the sample S is irradiated with the primary X-rays, the detector 30 detects the fluorescence X-rays generated at the analysis surface of the sample S.

In the X-ray analyzer 101, the sample S is accommodated in the sample chamber 20 to reduce the risk of the user's exposure to the X-rays transmitted through the sample chamber. The sample base 21 and the upper chamber 22, constituting the sample chamber 20, are formed of shielding material. That is, the sample chamber 20 is formed of shielding material. Japanese Unexamined Patent Application Publication No. 2011-022163 (Patent Document 1) discloses that, for example, iron having a thickness of 3.2 mm is used as a shielding material. FIG. 4 shows the relation between the thickness of iron and the X-ray transmission. Referring to FIG. 4, in a case where iron having a thickness of 15 mm is used as shielding material, the X-rays of the tube-voltage 50 kV transmitted through the sample chamber 20 are attenuated by 10 orders of magnitude, thereby significantly reducing the risk of the user's exposure to X-rays. Further, in general, in a case where iron is used as the shielding material of the sample chamber 20, nickel-plating is applied to the iron as an antirust countermeasure. An example of a Patent Document related to the antirust countermeasure of iron by nickel, Japanese Unexamined Patent Application Publication No. 2004-197151 (Patent Document 2) can be exemplified.

PRIOR ART DOCUMENT

Patent Document

Patent Document 1: Japanese Unexamined Patent Application Publication No. 2011-022163
Patent Document 2: Japanese Unexamined Patent Application Publication No. 2004-197151

SUMMARY OF THE INVENTION

Problems to be Solved by the Invention

In a case where the inner surface of the sample chamber 20 made of iron is plated with nickel, when X-rays transmitted through the sample S hit against the sample base 21 or the upper chamber 22, fluorescence X-rays (Ni-K: 7478 eV) of nickel are generated. Such fluorescence X-rays of nickel can be detected together with fluorescence X-rays generated at the analysis surface of the sample S by the detector 30. Therefore, fluorescence X-rays analysis results may be adversely affected. Further, even in a case where the inner surface of the sample chamber 20 made of iron is not nickel-plated, when X-rays transmitted through the sample S hit against the sample base 21 or the upper chamber 22 of the sample chamber 20, fluorescence X-rays (FE-K: 6403 eV) of iron are generated. Such fluorescence X-rays of iron can also be detected together with fluorescence X-rays generated at the analysis surface of the sample S by the detector 30. Therefore, fluorescence X-rays analysis results may be adversely affected.

Hereinafter, note that fluorescence X-rays of nickel generated by hitting the X-rays transmitted through the sample S against the sample base 21 or the upper chamber 22 of the sample chamber 20 are also referred to as "nickel-derived impure rays," while fluorescence X-rays of ion generated by hitting the X-rays transmitted through the sample S against the sample base 21 or the upper chamber 22 of the sample chamber 20 are also referred to as "Fe-derived impure rays."

Nickel can be an analysis target in the X-ray fluorescence analyzer 101. For example, in a case where the sample S is a drug, a food, a chemical, or the like, a microanalysis of nickel may be performed to determine the impurities of the sample S. In such cases, nickel-derived impure rays are considered to be a significant obstacle to the microanalysis of nickel in the sample S.

In recent years, there has been an increasing need for ppm order analyses using an X-ray fluorescence analyzer. To perform a microanalysis, a ppm order of a standard sample must be prepared. An acid solvent, such as, e.g., hydrochloric acid, is generally used in preparing such a standard sample. The acid solvent volatilizes when performing a fluorescence X-ray analysis of a standard sample containing an acid solvent. The volatilized acidic solvent erodes the nickel-plating applied to the inner surface of the iron sample chamber 20. Although this did not affect the result of the analysis itself, there is a problem that darkening occurs on the inner surface of the sample chamber 20, thereby undermining the aesthetics of the X-ray fluorescence analyzer.

An objective of the present invention is to reduce the effect due to impure rays derived from nickel and impure rays derived from the iron on a fluorescence X-ray fluorescence analysis in an X-ray fluorescence analyzer having an iron sample chamber and suppress the occurrence of darkening on an inner surface of a sample chamber by an acid solvent.

Means for Solving the Problems

The present invention provides the following X-ray fluorescence analyzer.

[1] An X-ray fluorescence analyzer comprising:
an X-ray source configured to irradiate a sample with X-rays;
a detector configured to detect fluorescence X-rays emitted from the sample due to X-ray irradiation; and
a steel sample chamber configured to accommodate the sample,
wherein at least a part of an inner surface of the sample chamber is coated with a layer made of aluminum derived from molten aluminum.

With this configuration, it is possible to reduce the effects due to nickel-derived impure rays and iron-derived impure rays on the fluorescence X-rays analysis. Furthermore, the occurrence of darkening on the inner surface of the sample chamber due to an acid solvent can be suppressed.

[2] The X-ray fluorescence analyzer as recited in the above-described Item [1],
wherein substantially an entire surface of the inner surface of the sample chamber is coated with the layer made of aluminum derived from molten aluminum.

With this configuration, it is possible to more sufficiently reduce the effects due to nickel-derived impure rays and iron-derived impure rays on the fluorescence X-rays analysis.

[3] The X-ray fluorescence analyzer as recited in the above-described Item [1] or [2],
wherein a coating layer is further formed on the layer made of aluminum derived from molten aluminum, and
wherein the coating layer is a layer for attenuating fluorescence X-rays of aluminum.

With this configuration, it is possible to reduce the effect due to aluminum-derived impure rays on the fluorescence X-rays analysis.

[4] The X-ray fluorescence analyzer as recited in the above-described Item 3,
wherein the coating layer is a layer made of carbon.

With this configuration, it is possible to more sufficiently reduce the effects due to impure rays derived from aluminum on the fluorescence X-ray analysis.

Effects of the Invention

According to the present invention, in the X-ray fluorescence analyzer having an iron sample chamber, it is possible to more sufficiently suppress the occurrence of darkening on the inner surface of the sample chamber by an acid-solvent and reduce the effect due to nickel-derived impure rays and iron-derived impure rays on a fluorescence X-ray analysis.

EMBODIMENTS FOR CARRYING OUT THE INVENTION

Hereinafter, some embodiments of the present invention will be described, but the present invention is not limited thereto. In this specification, the expression in the form "A to B" means the upper and lower limits of the range (that is, A or more and B or less), and when the unit is not described in A and the unit is described only in B, the unit of A and the unit of B are the same.

<X-ray Fluorescence Analyzer>

Figure 1:
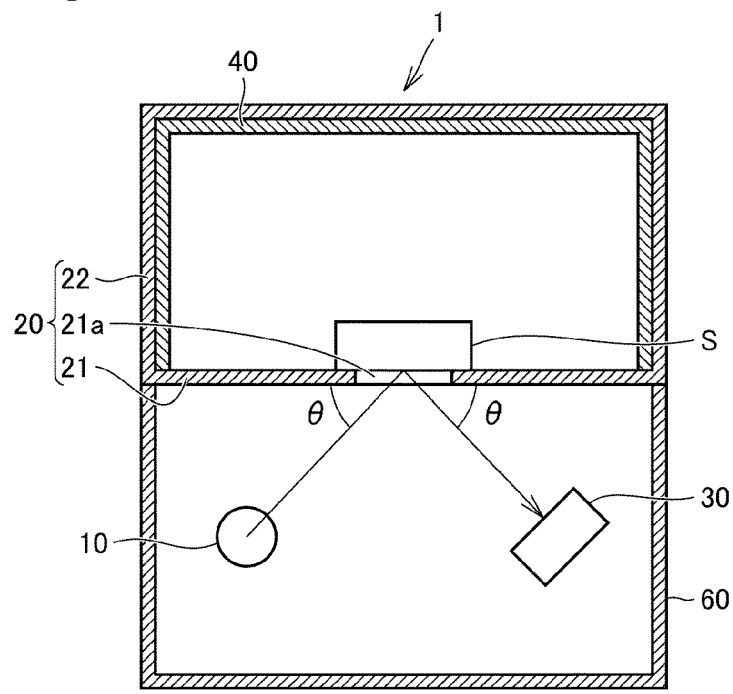
FIG. 1 is a schematic diagram showing one example of an X-ray fluorescence analyzer according to the present invention.

FIG. 1 is a schematic diagram showing one example of an X-ray fluorescence analyzer according to an embodiment of the present invention. Note that the same configurations as those of the conventional X-ray fluorescence analyzer 101 described above are assigned by the same reference symbols.

The X-ray fluorescence analyzer 1 according to the present invention is provided with an X-ray source 10 for irradiating a sample S with X-rays, a detector 30 for detecting fluorescence X-rays emitted from the sample S by being irradiated with X-rays, and an iron sample chamber 20 for accommodating the sample S. At least a part of the sample chamber 20 is coated with a layer 40 made of aluminum derived from molten aluminum. The inner surface of the sample chamber 20 is not nickel-plated. Hereinafter, the "layers 40 made of aluminum derived from molten aluminum" are also referred to as "molten aluminum layer 40."

In the X-ray fluorescence analyzer 1 according to the present invention, the inner surface of the sample chamber 20 made of iron is not nickel-plated. Therefore, it is considered that nickel-derived impure rays will not be generated. That is, in the X-ray fluorescence analyzer 1 according to the present invention, the generation of impure rays derived from nickel is suppressed, which makes it possible to reduce the effect due to impure rays derived from nickel on the fluorescence X-ray analysis.

In the X-ray fluorescence analyzer 1 according to the present invention, at least a part of the inner surface of the steel sample chamber 20 is covered with a molten aluminum layer 40. The X-rays generated from the X-ray source 10 pass through the molten aluminum layer 40 and reaches the sample base 21 and the upper chamber 22 of the sample chamber 20. As a consequence, iron-derived impure rays are generated.

Figure 5:
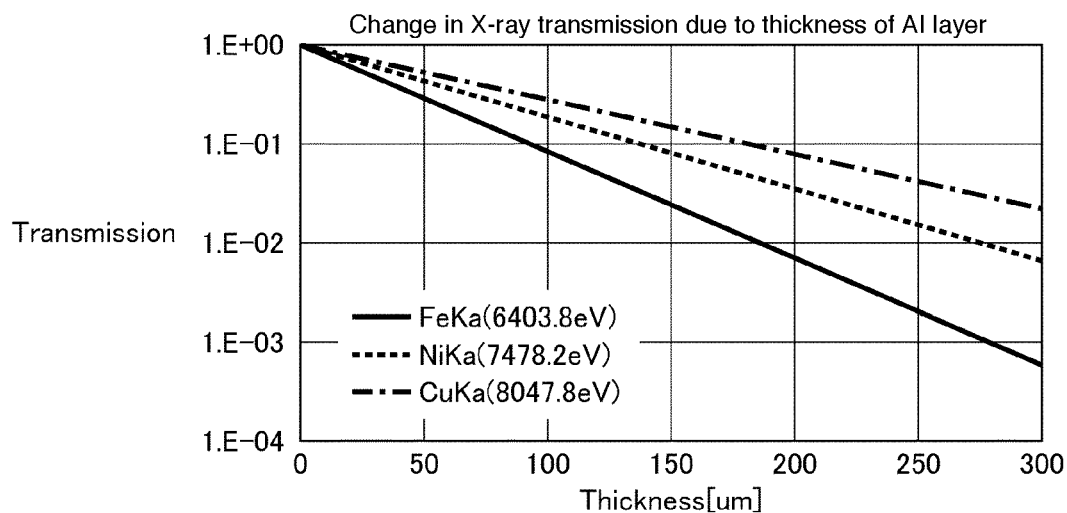
FIG. 5 is a diagram showing a relation between the thickness of a molten-aluminum-derived aluminum layer and the X-ray transmission.

As shown here in FIG. 5, the molten aluminum layer 40 attenuates the iron-derived impure rays. For example, as shown in FIG. 1, in a case where the inner surface of the upper chamber 22 is coated with the molten aluminum layer 40, it is considered that impure rays derived from iron generated from the upper iron chamber 22 are attenuated when transmitting through the molten aluminum layer 40 coated on the upper chamber 22. That is, in the X-ray fluorescence analyzer 1 according to the present invention, the generation of impure rays derived from iron is suppressed, which makes it possible to reduce the effect due to the impure rays derived from iron on the fluorescence X-ray analysis.

The molten aluminum layer 40 covers at least a part of the inner surface of the steel sample chamber 20. With this, it is possible to reduce the effect due to iron-derived impure rays on the fluorescence X-ray analysis as described above. The molten aluminum layer 40 may coat about 10%, about 20%, about 30%, about 40%, about 50%, about 60%, about 70%, about 80%, or substantially the entire inner surface of the sample chamber 20. In this specification, the expression "coat . . . substantially the entire inner surface of the sample chamber 20 refers to a condition in which 90% or more of the inner surface of the sample chamber 20 is coated. By increasing the percentage of the molten aluminum layer 40 coating the inner surface of the sample chamber 20, the generated impure rays derived from iron are significantly attenuated by the molten aluminum layer 40, which makes it possible to significantly reduce the effects due to impure rays derived from iron on the fluorescence X-ray analysis.

The molten aluminum layer 40 is superior in corrosion resistance, as compared with a nickel-plated layer. Therefore, it is expected that the occurrence of darkening in the inner surface of the sample chamber 20 by an acid-solvent is suppressed by coating at least a part of the inner surface of the molten aluminum layer 20 made of iron with a molten aluminum layer 40. In a case where substantially the entire inner surface of the sample chamber 20 is coated with the molten aluminum layer 40, it is expected that the occurrence of darkening of the sample chamber 20 due to an acid-solvent is significantly suppressed.

That is, in the X-ray fluorescence analyzer 1 according to the present invention, the effects due to nickel-derived impure rays and iron-derived impure rays on the fluorescence X-ray analysis can be reduced, and the occurrence of darkening on the inner surface of the sample chamber 20 due to an acid-solvent can also be suppressed.

《Molten Aluminum Layer》

The molten aluminum layer 40 is made of aluminum derived from molten aluminum. The molten aluminum layer 40 can be formed, for example, by the following steps (1) to (4).

(1) Preparing clean steel to be used as a base material of the iron sample chamber 20

(2) Subjecting the clean steel to a flux treatment as a pretreatment (3) Preparing a molten aluminum solution maintained at the melting point (about 660° C.) or higher.

(4) Immersing the clean steel subjected to the flux treatment in the molten aluminum solution for several minutes.

In this way, the surface of the steel can be coated with a molten aluminum layer. It is considered that an oxide film which is a passive state is formed on the outermost surface of the molten aluminum layer. Such an oxide film is expected to suppress the occurrence of darkening due to an acid solvent.

Although there is no particular limitation on the thickness of the molten aluminum layer 40, it is desirable that the thickness be such that a preferable effect obtained by applying the molten aluminum layer 40 instead of nickel plating (that is, a damping effect more significant than the damping effect of iron-derived impure rays obtained when the sample chamber made of iron has a structure in which the inner surface is nickel-plated) is obtained. The thickness of the nickel-plating is usually 5 to 15 μm (micrometers), and it is considered that the iron-derived impure rays can be attenuated to 30 to 67% by the thickness. Therefore, it is desirable that the molten aluminum layer 40 have a thickness capable of attenuating iron-derived impure rays to less than 30%.

For example, according to FIG. 5, in a case where the thickness of the molten aluminum layer 40 is, for example, 50 μm (micrometers), iron-derived impure rays transmitted through the molten aluminum layer 40 are attenuated to about 17.0% as compared with the case before transmitted through the molten aluminum layer 40, and therefore it is preferable. In a case where the thickness of the molten aluminum layer 40 is, for example, 100 μm (micrometers), the iron-derived impure rays transmitted through the molten aluminum layer 40 is attenuated to about 8.5% as compared with the case before transmitted through molten aluminum layer 40, and therefore it is preferable. In a case where the thickness of the molten aluminum layer 40 is, for example, 200 μm (micrometers), the iron-derived impure rays transmitted through the molten aluminum layer 40 is attenuated to about 0.8% as compared with the case before transmitted through molten aluminum layer 40, and therefore it is preferable. On the other hand, in a case where the thickness of the molten aluminum layer 40 is less than 25 μm (micrometers), there is a possibility that there is room for improving the attenuation of iron-derived impure rays. In a case where the thickness of the molten aluminum layer 40 exceeds 1,000 μm (micrometers), it may be difficult to form a molten aluminum layer 40 itself. In this case, in the above-described step (4), instead of immersing the clean steel subjected to flux treatment in the molten aluminum solution for several minutes, other means, such as, e.g., performing aluminum casting on the steel, may become reasonable. For the reasons mentioned above, for example, the thickness of the molten aluminum layer 40 may be greater 25 μm (micrometers) or more and less than 1,000 μm (micrometers).

When the X-rays generated from the X-ray source 10 hit against the molten aluminum layer 40, fluorescence X-rays (Al-K: 1486 eV) of aluminum are generated. However, the effect due to the fluorescence X-rays of aluminum on the fluorescence X-rays analysis result is considered to be limited. This is because, normally, the fluorescence X-rays of aluminum significantly differ in the energy from an element as an analysis target by the X-ray fluorescence analyzer. Hereinafter, the terminology "aluminum fluorescence X-rays" is also referred to as "aluminum-derived impure rays."

《Coating Layer》

Figure 2:
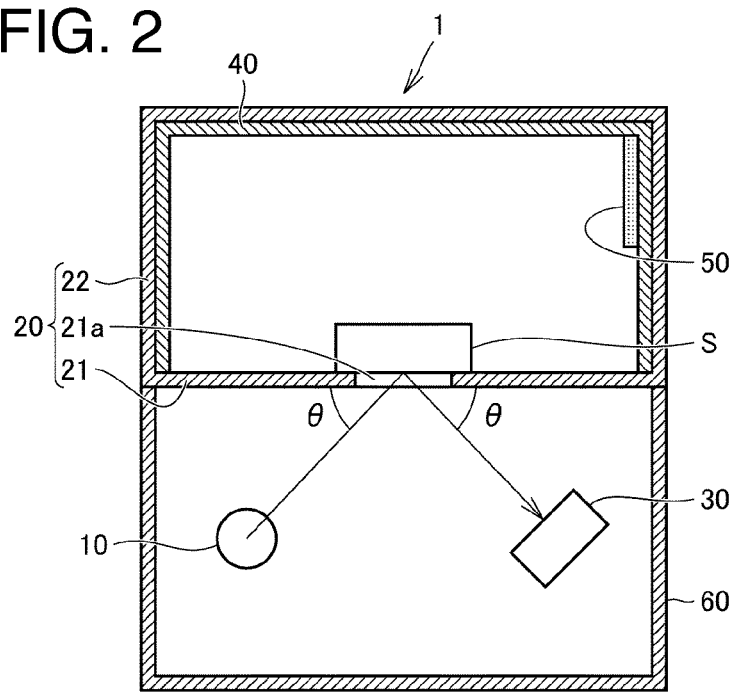
FIG. 2 is a schematic diagram showing another example of the X-ray fluorescence analyzer according to the present invention.
Figure 3:
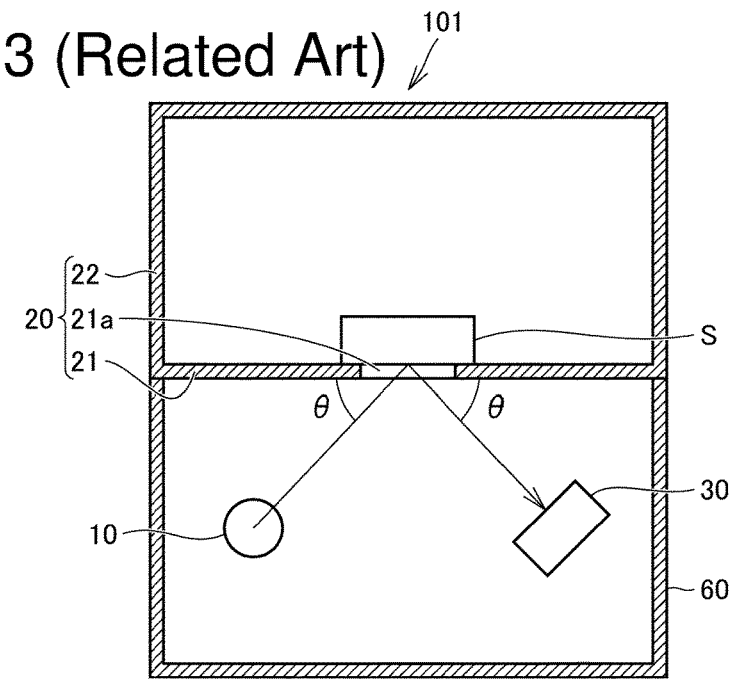
FIG. 3 is a schematic diagram showing one example of a conventional X-ray fluorescence analyzer.
Figure 4:
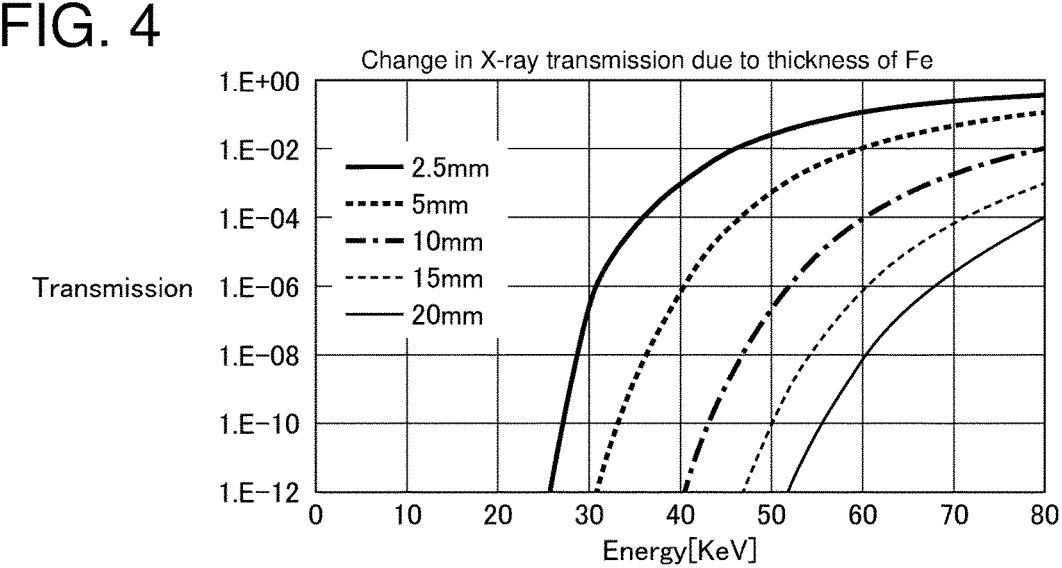
FIG. 4 is a diagram showing a relation between the thickness of iron and the X-ray transmission.

Referring to FIG. 2, a coating layer 50 may further be formed on the molten aluminum layer 40. The coating layer 50 is a layer for attenuating impure rays derived from aluminum. It is considered that aluminum-derived impure rays generated from the molten aluminum layer 40 are attenuated when transmitted through the coating layer 50 provided on the molten aluminum layer 40. With this, it is expected that the effect due to aluminum-derived impure rays on the fluorescence X-rays analysis is significantly reduced.

The material constituting the coating layer 50 is not particularly limited as long as it attenuates impure rays derived from aluminum and does not generate fluorescence X-rays that interferes with the fluorescence X-rays analysis itself, and can be provided on the molten aluminum layer 40 even in a case where the molten aluminum layer 40 has a complicated shape, such as, e.g., a free curved surface. For example, the coating layer 50 may be a layer made of carbon, boron nitride (BN), polyimide, polymethyl methacrylate (PMMA), or the like.

Figure 6:
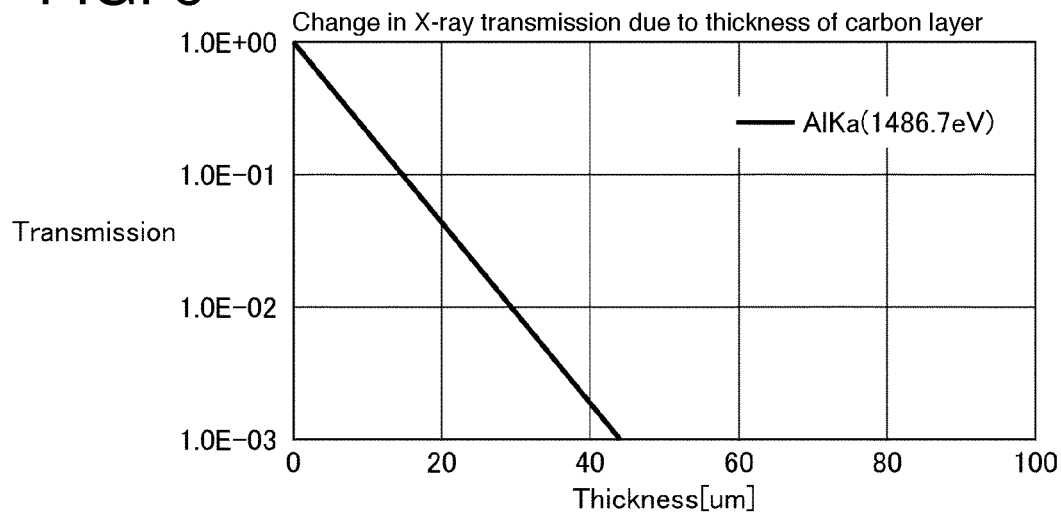
FIG. 6 is a diagram showing a relation between the thickness of a carbon layer and the X-ray transmittance.

Preferably, the coating layer 50 is made of carbon. As shown in FIG. 6, in a case where the thickness of the coating layer 50 made of carbon is 50 μm (micrometers), the aluminum-derived impure rays transmitted through the coating layer 50 are attenuated to about 0.04% as compared with the case before transmitted through coating layer 50. With this, the effect due to aluminum-derived impure rays on the fluorescence X-rays analysis is significantly reduced. Note that even in a case where the coating layer 50 is a layer made of BN, polyimide, or PMMA, aluminum-derived impure rays are attenuated to about the same extent as the carbon-derived coating layer 50.

Here, it is preferable that X-ray fluorescence analyzer according to the present invention include an alloy layer made of a material (for example, iron) constituting the sample chamber and aluminum between the inner surface of the sample chamber and the layer made of molten aluminum-derived aluminum. In this aluminum alloy layer, the composition ratio of the material constituting the sample chamber to aluminum is preferably 5:1 to 1:5, more preferably 2:1 to 1:2, and most preferably 1:1.

In this case, the X-ray fluorescence analyzer has a layer structure including, on the inner surface of the sample chamber, an alloy layer of the inner surface side of the sample chamber, as a molten aluminum layer and the aluminum layer formed on the alloy layer. It is desirable that the molten aluminum layer has a thickness capable of attenuating the iron-derived impure rays to less than 30%, and for example, the combined thickness of the alloy layer and the aluminum layer may be 25 μm (micrometers) or more and less than 1,000 μm (micrometers). Furthermore, in a case where the molten aluminum layer includes the alloy layer and the aluminum layer, the aluminum layer is preferably 12.5 to 500 μm (micrometers), more preferably 25 to 200 μm (micrometers), and still more preferably 50 to 100 μm (micrometers).

The presently disclosed embodiments and examples are illustrative in all respects and should not be considered as limiting. The scope of the present invention is indicated by claims rather than by embodiments and examples as described above, and is intended to include all modifications within the meaning and scope equivalent to the claims.

DESCRIPTION OF SYMBOLS

1, 101: X-ray fluorescence analyzer
10: X-ray source;
20: Sample chamber
21: Sample base
22: Upper chamber
30: Detector
40: Molten aluminum layer
50: Coating layer
60: Device housing
21*a*: Opening
S: Sample

The invention claimed is:

1. An X-ray fluorescence analyzer comprising:
an X-ray source configured to irradiate a sample with X-rays;
a detector configured to detect fluorescence X-rays emitted from the sample due to X-ray irradiation; and
a steel sample chamber configured to accommodate the sample,
wherein at least a part of an inner surface of the steel sample chamber is coated with a layer made of aluminum derived from molten aluminum.

2. The X-ray fluorescence analyzer as recited in claim 1, wherein 90% or more of an entire surface of the inner surface of the steel sample chamber is coated with the layer made of aluminum derived from molten aluminum.

3. The X-ray fluorescence analyzer as recited in claim 1, wherein a coating layer is further formed on the layer made of aluminum derived from molten aluminum, and wherein the coating layer is a layer for attenuating fluorescence X-rays of aluminum.

4. The X-ray fluorescence analyzer as recited in claim 3, wherein the coating layer is a layer made of carbon.

5. The X-ray fluorescence analyzer as recited in claim 3, wherein the coating layer is made of boron nitride.

6. The X-ray fluorescence analyzer as recited in claim 3, wherein the coating layer is made of polyimide.

7. The X-ray fluorescence analyzer as recited in claim 3, wherein the coating layer is made of polymethyl methacrylate (PMMA).

8. The X-ray fluorescence analyzer as recited in claim 1, wherein the steel sample chamber does not include the X-ray source and the detector, and
wherein only the inner surface of the steel sample chamber is coated with the layer made of aluminum derived from molten aluminum.

9. The X-ray fluorescence analyzer as recited in claim 1, wherein the layer made of aluminum derived from molten aluminum has a thickness greater than 25 mm and less than 1000 mm.

10. The X-ray fluorescence analyzer as recited in claim 1, further comprising a coating layer on the layer made of aluminum derived from molten aluminum.

11. A method of making an X-ray fluorescence analyzer comprising:
preparing a steel sample chamber configured to accommodate a sample, wherein at least a part of an inner surface of the steel sample chamber is coated with a layer made of aluminum derived from molten aluminum, wherein preparing the steel sample chamber includes:
preparing clean steel;
subjecting the clean steel to a flux treatment as a pretreatment;
preparing a molten aluminum solution maintained at at least a melting point of aluminum; and immersing the clean steel subjected to the flux treatment in the molten aluminum solution to form steel coated with a layer made of aluminum derived from molten aluminum;

wherein the X-ray fluorescence analyzer further comprises an X-ray source configured to irradiate a sample with X-rays, and a detector configured to detect fluorescence X-rays emitted from the sample due to X-ray irradiation.

12. The method of claim 11, further comprising adding a coating layer on the layer made of aluminum derived from molten aluminum.

13. The method of claim 12, wherein the coating layer comprises carbon.

14. The method of claim 12, wherein the coating layer comprises boron nitride.

15. The method of claim 12, wherein the coating layer comprises polyimide.

16. The method of claim 12, wherein the coating layer comprises polymethyl methacrylate (PMMA).

* * * * *